(12) United States Patent
Temmesfeld

(10) Patent No.: US 6,705,481 B2
(45) Date of Patent: Mar. 16, 2004

(54) ACTUATABLE FUEL TANK CLOSURE HAVING GUIDE PIPE

(75) Inventor: Angelika Barbara Marie Temmesfeld, Raubling (DE)

(73) Assignee: Temtec Fahrzeutechnick (DE)

( * ) Notice: Subject to any disclaimer, the term of this patent is extended or adjusted under 35 U.S.C. 154(b) by 0 days.

(21) Appl. No.: 09/878,175

(22) Filed: Jun. 12, 2001

(65) Prior Publication Data

US 2002/0088801 A1 Jul. 11, 2002

Related U.S. Application Data

(63) Continuation-in-part of application No. 09/272,258, filed on Mar. 19, 1999, now abandoned.

(30) Foreign Application Priority Data

Mar. 20, 1998 (DE) .......................................... 198 12 384

(51) Int. Cl.[7] ................................................ B65D 47/00
(52) U.S. Cl. ..................... 220/86.2; 141/350; 220/86.1; 220/DIG. 33
(58) Field of Search .............................. 220/86.1, 86.2, 220/DIG. 33, 259.1–259.3, 254.1, 254.3, 254.6, 254.7, 254.9, 254.2; 141/350

(56) References Cited

U.S. PATENT DOCUMENTS

| | | |
|---|---|---|
| 405,425 A | 6/1889 | Lurim |
| 634,730 A | 10/1899 | Howe et al. |
| 1,985,904 A | 3/1935 | Murch |
| 2,765,948 A | 10/1956 | Paley et al. |
| 2,769,566 A | 11/1956 | Thompson |
| 3,014,688 A | 12/1961 | McCollum |
| 3,062,496 A | 11/1962 | Stehlin |
| 3,478,922 A | 11/1969 | Mole |
| 4,091,958 A * | 5/1978 | Zemke ........................ 220/291 |
| 4,091,959 A | 5/1978 | O'Banion |
| 4,256,285 A | 3/1981 | Davidson |
| 4,260,129 A | 4/1981 | Groenefeld |
| 4,327,783 A | 5/1982 | Kanno et al. |
| 4,762,247 A | 8/1988 | Temmesfeld |
| 4,881,655 A | 11/1989 | Jansky et al. |
| 4,932,444 A | 6/1990 | Micek |
| 5,022,433 A | 6/1991 | Jansky et al. |
| 5,042,678 A | 8/1991 | Munguia |
| 5,195,566 A | 3/1993 | Ott et al. |
| 5,234,122 A * | 8/1993 | Cherng ........................ 220/211 |
| 5,242,075 A * | 9/1993 | Ott et al. ..................... 220/361 |
| 5,253,920 A | 10/1993 | Eldridge |
| 5,465,861 A * | 11/1995 | Kunz et al. ................. 220/260 |
| 5,467,621 A * | 11/1995 | Gravino ............... 220/DIG. 33 |
| 5,538,055 A | 7/1996 | Kunz et al. |

(List continued on next page.)

FOREIGN PATENT DOCUMENTS

| | | |
|---|---|---|
| DE | 3641 274 A1 | 6/1987 |
| DE | 3819689 | 12/1989 |
| DE | 42 17 966 C1 | 5/1993 |
| DE | 4237 790 A1 | 5/1994 |
| DE | 195 32 777 C1 | 12/1996 |
| DE | 0 943 477 A3 | 9/1999 |
| EP | 0102083 | 3/1984 |
| EP | 597314 | 5/1994 |
| EP | 0 602 440 A1 | 6/1994 |

Primary Examiner—Robin A. Hylton
(74) Attorney, Agent, or Firm—Nixon Peabody LLP; Donald R. Studebaker

(57) ABSTRACT

A fuel tank closure for attachment on the tank filler pipe of a motor vehicle including a movable closure part which selectively opens or closes the access to the interior of the tank filler pipe. Furthermore, the fuel tank closure includes a coupling part for actuating the closure part. The fuel tank closure has a guide pipe which extends into the interior of the tank filler pipe. The guide pipe keeps open a "no-lead flap" which prevents fueling the motor vehicle with leaded fuel. Furthermore problem-free refueling is ensured by the guide pipe.

47 Claims, 7 Drawing Sheets

U.S. PATENT DOCUMENTS

| | | | | |
|---|---|---|---|---|
| 5,547,099 A | * | 8/1996 | Chang | 220/212.5 |
| 5,690,153 A | | 11/1997 | Steinkaemper et al. | |
| 5,690,154 A | | 11/1997 | Kremer et al. | |
| 5,730,194 A | | 3/1998 | Foltz | |
| 5,732,841 A | * | 3/1998 | Jocic et al. | 220/203.24 |
| 5,732,842 A | | 3/1998 | Krause et al. | |
| 5,791,387 A | | 8/1998 | Palvolgyi | |
| 5,829,495 A | | 11/1998 | Corfitsen | |
| 5,908,130 A | | 6/1999 | Chang | |
| 5,944,075 A | | 8/1999 | Turner et al. | |
| 6,035,906 A | | 3/2000 | Ott | |
| RE37,776 E | * | 7/2002 | Foltz | 220/86.2 |
| 6,446,685 B2 | * | 9/2002 | Stiegler et al. | 220/DIG. 33 |

* cited by examiner

ACTUATABLE FUEL TANK CLOSURE HAVING GUIDE PIPE

This application is a Continuation-in-Part of application Ser. No. 09/272,258, filed Mar. 19, 1999 now abandoned.

BACKGROUND OF THE INVENTION

1. Field of the Invention

The present invention relates to a fuel tank closure for attachment on a tank filler pipe of a motor vehicle. More specifically, the invention relates to a fuel tank closure with a coupling part for actuating a movable closure part which selectively opens or closes the access to the interior of the tank filler pipe.

2. Description of Related Art

In the following description of the related art as well as in the description of the present invention, the terms "top" and "bottom" are used in a manner such that "at the bottom" or "down" means in the general direction of the tank filler pipe toward the interior of the tank which is to be closed by the fuel tank closure. Conversely, "top" and "up" means the opposite direction, i.e. the axial direction of the filler pipe leading away from the interior of the tank to the outside of the motor vehicle.

A fuel tank closures of the general type claimed in the present invention is generally disclosed in U.S. Pat. No. 5,465,861. This prior art fuel tank closure can remain installed on the mouth of the filler pipe during fueling and allows simple operation by opening and closing of a closure part during the fueling of the motor vehicle. The driver of the motor vehicle is relieved of the task of removing the fuel tank closure from the filler pipe during fueling and also is relieved from replacing the fuel tank closure after fueling the motor vehicle. Operation is so simple that it can also be done by an automatic fueling means.

However, several very important limitations and disadvantages have been found in these prior art fuel tank closures. In such prior art fuel tank closures which remains installed on the mouth of the tank filler pipe during fueling, the fuel nozzle can no longer be inserted as deeply into the tank filler pipe as is possible in conventional closures which are completely removed from mouth of the tank filler pipe during fueling. This can be particularly prevalent and dangerous during manual fueling of the motor vehicle using a conventional fuel nozzle. When such fuel nozzles are not inserted very deeply into the tank filler pipe, there is a potential and serious danger that the automatic final shutoff of the fuel nozzle does not trigger at the right time thereby causing the tank filler pipe to overflow during and after the fueling. Another problem in such prior art system is that it fails to provide an effective and reliable integral inside flap (so-called no-lead flap) which is provided in most vehicles for protecting against fueling with leaded gasoline that is conventionally dispensed from a fuel nozzle with a larger diameter. Because such integral inside flap is not provided, the prior art fuel tank closures necessitates that the no-lead flap be toward the bottom of the tank filler pipe so that the fuel nozzle often does not open the flap when the fuel nozzle is not inserted very deeply into the tank filler pipe. Consequently, this problem poses an additional possibility for fuel spillage during fueling.

SUMMARY OF THE INVENTION

Therefore, the primary object of the present invention is to devise a fuel tank closure of the initially mentioned type which is placed on an edge of a mouth of a tank filler pipe and can remain there during the fueling process to enable comfortable and trouble-free refueling.

To achieve this primary object, a fuel tank closure in accordance with the present invention includes a guide pipe which extends into the interior of the tank filler pipe. The guide pipe in accordance with the present invention has a length dimensioned so that the guide pipe extends far into the tank filler pipe. It allows the fuel nozzle to be held and guided reliably and stably to ensure proper filling of the tank. Furthermore, the fuel tank closure in accordance with the present invention also responds to back pressure in the tank filler pipe at the proper time and interrupts the fuel feed from the fuel nozzle. Furthermore the no-lead flap is held in the open position by the guide pipe so that problem-free refueling is ensured even with no-lead flaps which are positioned toward the bottom of the tank filler pipe.

According to another embodiment of the present invention, a fuel tank closure is provided with a guide pipe having a section which tapers in the direction toward the interior of the insert pipe. This section may also be provided with openings so that the fuel vapors which have been displaced from the tank interior during fueling can escape to the outside or be drawn into the refueling means.

In the preferred embodiment, the guide pipe is made from a cylindrical section of steel with a wall thickness between 0.25 and 0.8 mm. In this way, the small annular gap which remains between the nozzle and the narrowest point of the fill channel can be used for accommodating the guide pipe. The stiffness of the guide pipe is enough to keep the inner flap in the open position. In this embodiment, the guide pipe includes a closure part which in the closed state, covers the mouth of the pipe part. The closure part is guided with a restraint by a crank guide such that when the fuel tank closure is opened in the first phase of the opening process, the closure part rises from the mouth of the pipe part in a roughly axial direction of the pipe part. In a subsequent second phase of the opening process, the closure part is swivelled around in the area of the pipe part, or its axial extension, in an axis which lies transversely to the longitudinal direction of the pipe part thereby clearing the mouth of the pipe part. The closure part is coupled to a coupling part which directly or indirectly controls the motion of the closure part. By means of a simple turning or pulling process on the coupling part, the closure part is raised in the first phase of the opening motion in the axial direction and then, is swivelled in a second phase of the opening motion to clear the mouth. By turning in the opposite direction or by releasing the coupling part, the fuel tank closure is closed in the reverse sequence. Therefore, the operation of the fuel tank closure in accordance with the present invention is simple and can also be managed by an automatic refueling means.

In accordance with another embodiment, the fuel tank closure may be provided with a coupling part which is coupled to a rotary ring by form-fit such that the coupling part is connected to be axially movable relative to the rotary ring and yet, prevent rotational motion and be torsionally strong. In this embodiment, the rotary ring engages a sliding sleeve via a screw connection formed by a helical groove and slide pins such that by turning the rotary ring, the sliding sleeve is pushed in the axial direction. In this manner, rotation of the rotary ring can be converted into purely axial displacement of the sliding sleeve thereby resulting in an especially reliable structure for actuating the closure part which is less susceptible to jamming and sticking. The closure part which is made in a cap-shape, is connected to the sliding sleeve via a pivot pin/hole connection and includes two diametrically opposite braces which extend in the axial direction. Thus, the closure part undergoes axial, torsion-free, displacement with the sliding sleeve, but retains a swivelling capacity around an axis which is transverse to the longitudinal axis of the pipe part as defined by the pivot pin/hole connection between the braces and the sliding sleeve.

In accordance with another embodiment of the present invention, the sliding sleeve is joined to the coupling part by form-fit such that the sliding sleeve is fixed with reference to the coupling part in the axial direction, but the coupling part can be turned relative to the sliding sleeve. The result is that the coupling part takes part in the axial displacement of the sliding sleeve when rotary motion is performed. The coupling part can be used in this manner to exert an additional force on the closure part in the direction of the mouth of the pipe part in order to ensure reliable closing.

In accordance with another embodiment of the present invention, the two braces of the closure part surround the pipe part on two sides and a restraint which generates the opening motion of the closure part is provided between the braces and the pipe part. Thus, the restraint may be provided on the inside of the braces and the outside of the pipe part and may be in the form of a crank guide. In one embodiment which is especially simple but very effective in terms of facilitating production, the crank guide is formed by a crank pin/crank groove such that on one of either the brace or the pipe part, there is a pin while on the other of the two parts, there is a groove which accommodates the crank pin. By practicing the present invention, the crank guide can simply comprise a single crank groove and a single crank pin on each of the two sides of the pipe part. In contrast, in order to achieve the swivelling motion of the closure part in the prior art fuel tank closures, a much more complicated arrangement comprising of at least two crank grooves and two crank pins was necessary. This embodiment of the present invention provides significant simplification of the fuel tank closure when the closure is assembled thereby providing a more precise guidance and increased operating reliability of the fuel tank closure. This simplification is enabled by the sliding sleeve executing pure axial motion and transferring it precisely to the braces of the closure part by means of the aforementioned pivot pin/hole connection. The closure part itself has only one degree of freedom of motion relative to the sliding sleeve and more specifically, the closure part swivels around the transverse axis defined by the pivot pin/hole connection. Therefore, sticking of the closure part is substantially eliminated.

According to yet another embodiment, the crank groove of the crank guide includes an axial section which runs in the axial direction, and an adjoining curved section. With the fuel tank closure closed and in the first phase of the opening motion, the crank pin of the crank guide is located in the first groove section while during the second phase of the opening motion, the crank pin enters the curved section.

In another embodiment of the present invention, the pipe part consists of a flange part with a cylindrical section and an insert pipe located within the cylindrical section. A lip seal may be provided between the insert pipe and the cylindrical section of the flange part which surrounds the insert pipe such that the lip seal projects over the edge of the mouth of the pipe part. The peripheral lip seal which is clamped between the two parts and which projects above the edge of the mouth ensures the tightness of the closure part in the closed position since it is protected from being damaged.

In fuel tank closures which are to be retrofitted on the tank filler pipe of a motor vehicle, the insert pipe may be advantageously threaded for screwing into the tank filler pipe. In this manner, the fuel tank closure can then be attached in place like an ordinary tank cap on the tank filler pipe of a motor vehicle. Alternatively, for tank filler pipes which are designed to accommodate a tank cap with a quarter turn fastener, the insert pipe may be provided with a pair of catch hooks in the manner of a quarter turn fastener to enable the attachment of the fuel tank closure on the tank filler pipe in the conventional manner.

According to another embodiment of the present invention, a rotary ring is axially fixed relative to the flange part and is supported to turn relative to the flange part. This guarantees that the rotary ring can execute rotary motion exclusively and is completely decoupled from the axial motion of the other parts.

Similarly, the flange part can be used to support the sliding sleeve so that it may be moved axially but cannot twist relative to the flange part. This in turn, ensures that the sliding sleeve can execute only axial motion relative to the stationary, immovable flange part and not cannot execute rotary motion.

According to another embodiment of the present invention, a plunger pipe is provided which is coupled to the motion of the closure part. The plunger part moves axially in the direction toward the mouth of the tank filler pipe when the fuel tank closure opens and is pressed by the closure part in the direction toward the bottom of the tank filler pipe when the fuel tank closure is closed. In this way the plunger pipe can actuate a valve or an electric switch, by which connections can be established and/or interrupted. For example, many vehicles are equipped with a so-called OBVR (On Board Vapor Recovery System) with an activated charcoal filter which collects the fuel vapors which have been displaced from the fuel tank during fueling and after fuel is delivered to the engine for combustion. In these systems the gas space of the fuel tank during fueling must be connected to the activated charcoal filter and separated after the fueling. Another application of the plunger pipe is as a valve which decouples the fuel equalization tank of the motor vehicle during refueling.

In one advantageous embodiment of the present invention, it is possible to accomplish opening and closing by pulling on a coupling part in the axial direction. To accomplish this purpose, the sliding sleeve may be supported to move axially together with the coupling part against the force of a pretensioning spring.

According to another advantageous embodiment, the side wall of the pipe part may also be provided with an overpressure/underpressure valve.

These and other objects, features and advantages of the present invention will become more apparent from the following detailed description of the invention when viewed in conjunction with the accompanying drawings.

DETAILED DESCRIPTION OF THE PREFERRED EMBODIMENTS

FIGS. 1 to 8 clearly illustrates fuel tank closures in accordance with various embodiments of the present invention which will be described in detail hereinbelow. As previously noted, the terms "top" and "bottom" are used in the descriptions of all these embodiments of the present invention in a manner such that "at the bottom" or "down" means in the general direction of a tank filler pipe toward the interior of the tank which is to be closed by the fuel tank closure. Conversely, "top" and "up" means the opposite direction, i.e. the axial direction of the filler pipe leading away from the interior of the tank to the outside of the motor vehicle.

Figure 1:
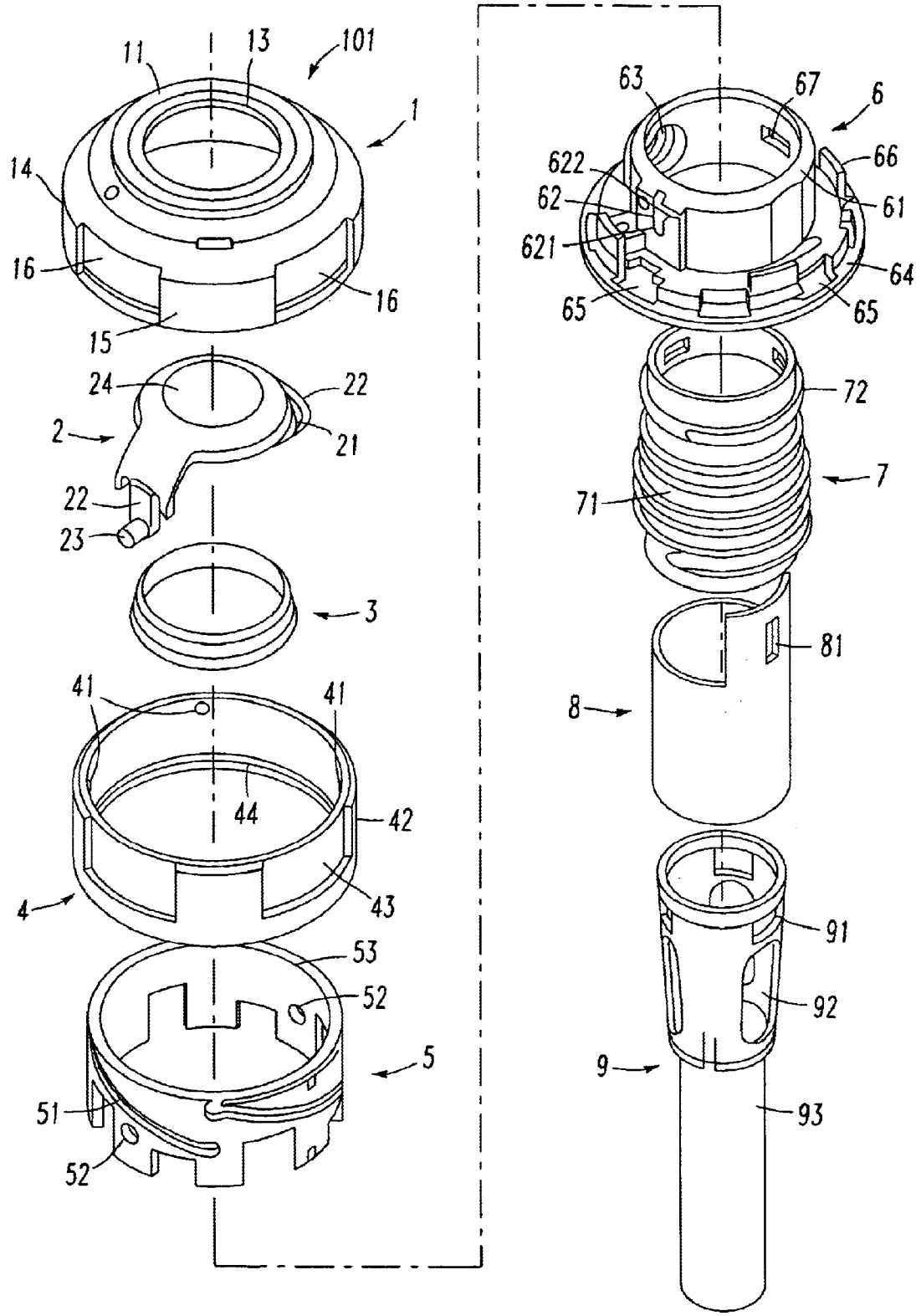
FIG. 1 shows a perspective exploded view of the fuel tank closure in accordance with one embodiment of the present invention.

The fuel tank closure 101 shown in FIG. 1 comprises a coupling part 1 which has a center opening 13 with an inside diameter which is larger than the diameter of a conventional standard fuel nozzle. In the area of the center opening 13, the coupling part 1 has a cylindrical section 11. The coupling part 1 widens downward following the cylindrical section 11 into another cylindrical section 14. The cylindrical section 14 is radially profiled with raised points 15 and sunken points 16 which continue into the inner wall of the cylindrical section 14.

The fuel tank closure 101 from FIG. 1 also comprises a closure part 2 with a cap 24 to which two braces 22 extending in the axial direction are attached on the two opposing sides of the cap 24. On each of the free ends of the two braces 22, there is one pivot pin 23 which points generally radially outward. On the inner sides of each of the two braces 22, there are crank pins 21 which point radially inward. The fuel tank closure 101 also comprises a lip seal 3 which is substantially cylindrical in shape. A rotary ring 4 which is substantially cylindrical in shape is also provided in the illustrated fuel tank closure 101. In the vicinity of the inside upper edge of the rotary ring 4, there are four slide pins 41 which project radially inward. The outside wall of the rotary ring 4 is profiled to be complementary to the inside wall of the coupling part 1 and has raised portions 42 and sunken portions 43. The outside diameter of the rotary ring 4 corresponds to the inside diameter of the cylindrical section 14 of the coupling part 1 so that the two parts fit into each other, the respectively raised and sunken points 15, 16 and portions 42, 43 complementary fitting with one another. On the inside wall of the rotary ring 4, there is a peripheral groove 44.

In addition, a cylindrical sliding sleeve 5 is provided with four helical grooves 51 on its outside wall. The outside diameter of the sliding sleeve 5 corresponds to the inside diameter of the rotary ring 4 so that the sliding sleeve 5 is guided to fit in the rotary ring 4 while the slide pins 41 fit into the helical grooves 51. The sliding sleeve 5 is also provided with two diametrically opposing through holes 52. The lower edge of the sliding sleeve 5 is crenelated while on the upper edge, there is provided a peripheral catch bridge 53 which points radially inward.

A flange part 6 which has a cylindrical section 61 and a radial section 64 is also provided in the fuel tank closure 101. The outside diameter of the cylindrical section 61 corresponds roughly to the distance between the two axial braces 22 of the closure part 2. Crank guide is also provided on the cylindrical section 61 as will be discussed below. Crank grooves 62 which is a component of the crank guide (only one shown) are provided at two diametrically opposing points on the cylindrical section 61 to accommodate the crank pins 21 located on the inside of the braces 22 of the closure part 2. Each of the crank grooves 62 has an axial section 621 in the bottom area and an adjoining curved section 622 in the top area. As can be seen from FIG. 1, the crank groove 62 curves to the right in the top area. In the other crank groove (not shown) which is diametrically opposite the illustrated crank groove 62, the top curved section has a left-hand curvature so that the two curved sections end parallel and pointing in the same direction. These crank grooves 62 and the crank pins 21 essentially form the crank guide which restrains the movement of the closure part 2 and causes the closure part 2 to swivel in operation as will be explained below. The inside wall of the cylindrical section 61 are provided with notches 67. Furthermore an overpressure/underpressure valve 63 which is used for pressure equalization of the fuel tank may also be positioned on the cylindrical section 61. The radial section 64 of the flange part 6 is provided with openings 65 which correspond in their shape to the crenelated bottom edge of the sliding sleeve 5. Furthermore, elastic claws 66 are provided on the radial section 64 which can fit into the peripheral groove 44 of the rotary ring 4.

The fuel tank closure 101 shown in FIG. 1 is designed to be retrofitted on a motor vehicle which has a screw-in tank cap closure. Consequently, the fuel tank closure 101 of FIG. 1 includes an insert pipe 7 which has an outside thread 71. The outside thread 71 is dimensioned such that it can be screwed into a standard tank filler pipe. The insert pipe 7 has a radially projecting saw tooth projection 72 in its top area. The outside diameter of the insert pipe 7 in this top area corresponds to the inside diameter of the cylindrical section 61 of the flange part 6. The notches 67 fit behind the saw tooth projection 72 in the assembled state so that the flange part 6 and the insert pipe 7 can be securely joined to one another.

In the present illustrated embodiment, there is also provided, a plunger pipe 8 which has an apron 81 for actuating the tank vent valve or the like (not shown). With the closure part 2 opened, the apron 81 of the plunger pipe 8 projects above an edge of a mouth of the tank filler pipe formed by the openings of the flange part 6 and the insert pipe 7 and can be used to actuate a valve (not shown) located within the tank filler pipe. When the closure part 2 is closed, the apron 81 of the plunger pipe 8 is pressed down so that this valve (not shown) can be actuated in the opposite direction. For example, the plunger pipe 8 may be used in this manner to operate an On Board Vapor Recovery System.

Finally, the fuel tank closure 101 according to the first embodiment as illustrated in FIG. 1 comprises a guide pipe 9 having a conical section or positioning and retention skirt 91 with openings 92 and a cylindrical section 93.

Figure 2:
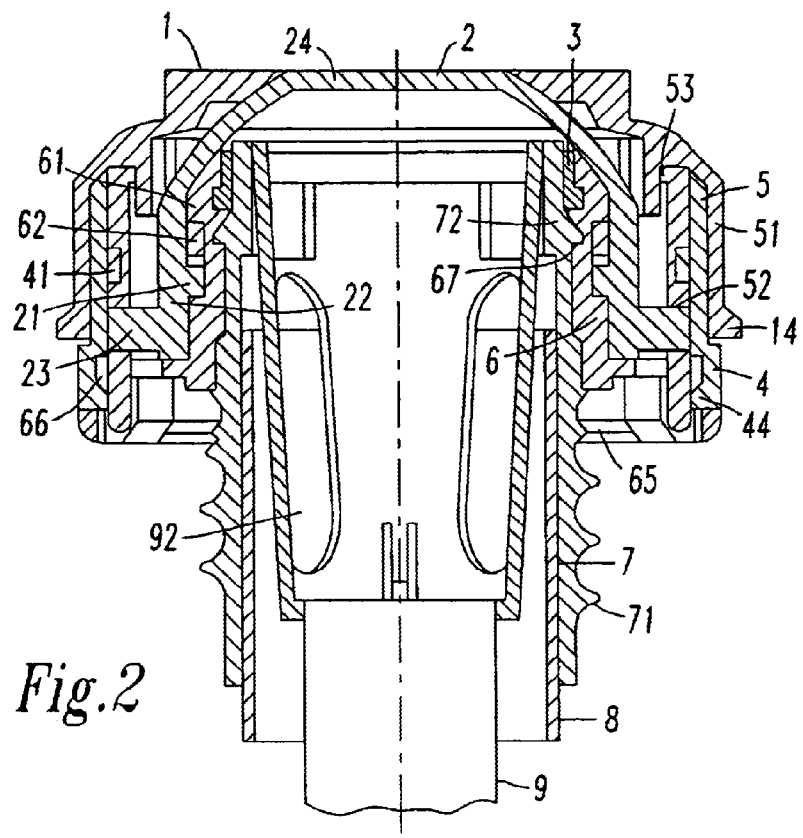
FIG. 2 shows a longitudinal cross sectional view of the assembled fuel tank closure of FIG. 1.

FIG. 2 shows a longitudinal cross sectional view of the assembled fuel tank closure 101 of FIG. 1 discussed above.

The pipe part of the fuel tank closure 101 which can be closed by the closure part 2 is comprised of the cylindrical section 61 of the flange part 6 and the top area of the insert pipe 7, the openings of which form the mouth. On the upper edge of the mouth between the cylindrical section 61 and the top area of the insert pipe 7, the lip seal 3 is pressed in and projects slightly in the axial direction thereby performing the sealing function relative to the closure part 2. The flange part 6 and the insert pipe 7 are locked to one another via the saw tooth projection 72 and the notches 67 so that a rigid connection is established between the two parts. The plunger pipe 8 and the guide pipe 9 are positioned within the insert pipe 7.

In the closed state of the fuel tank closure 101, the edge of the mouth of the pipe part which comprises the cylindrical section 61 and the top area of the insert pipe 7, that is, the edge provided with the lip seal 3, is covered by the cap 24 of the closure part 2. The two diametrically opposing braces 22 of the closure part 2 surround the cylindrical section 61 of the flange part 6 and the pins 21 of the closure part 2 fit into the grooves 62 of the flange part 6. The sliding sleeve 5 is supported by the flange part 6. Because the crenelated bottom edge of the sliding sleeve 5 fits into the openings 65 of the flange part 6, precise axial guidance is provided but the sliding sleeve 5 cannot twist with respect to the flange part 6. The pivot pins 23 of the closure part 2 fit into the diametrically opposing holes 52 of the sliding sleeve 5. The sliding sleeve 5 is surrounded by the rotary ring 4 and the slide pins 41 of the rotary ring 4 which project radially inward, fit into the helical grooves 51 of the sliding sleeve 5. The claws 66 of the flange part 6 fit into the peripheral groove 44 of the rotary ring 4 so that the rotary ring 4 is rotationally mounted but fixed in its axial position.

The coupling part 1 with its cylindrical section 14 partially covers the rotary ring 4 and the raised and sunken points 15, 16 and portions 42, 43 of the two parts complementary fit with one another so that a form-fitted, torsionally strong connection is established between the coupling part 1 and the rotary ring 4. However, the coupling part 1 remains freely movable in the axial direction relative to the rotary ring 4. Three projecting claws (not shown) of the coupling part 1 fit behind the catch bridge 53 of the sliding sleeve 5 so that the coupling part 1 and the sliding sleeve 5 are mutually fixed axially, but can be rotated relative to one another.

In operation, the fuel tank closure 101 which has the dimensions of a standard tank cap, is threaded with the thread 71 of the insert pipe 7 into a motor vehicle tank filler pipe (not shown) for receiving a screw closure. The insert pipe 7 may be secured against screwing out by a cotter pin (not shown).

In the position shown in FIG. 2, the mouth formed by the opening of the flange part 6 and the insert pipe 7 is sealed tight by the cap 24 of the closure part 2 together with the interpositioned lip seal 3. The closure part 2 is pressed against the lip seal 3 since the pivot pins 23 of the closure part 2 are pulled by the sliding sleeve 5 in the direction toward the interior of the tank filler pipe. In addition, the coupling part 1 presses against the closure part 2 and secures it against unintended opening even during an accident. A corresponding configuration of the helical groove 51 in the sliding sleeve 5 causes the slide pins 41 to catch in the closed position in the helical groove 51 thereby maximizing the pre-stress in the axial direction.

Figure 7:
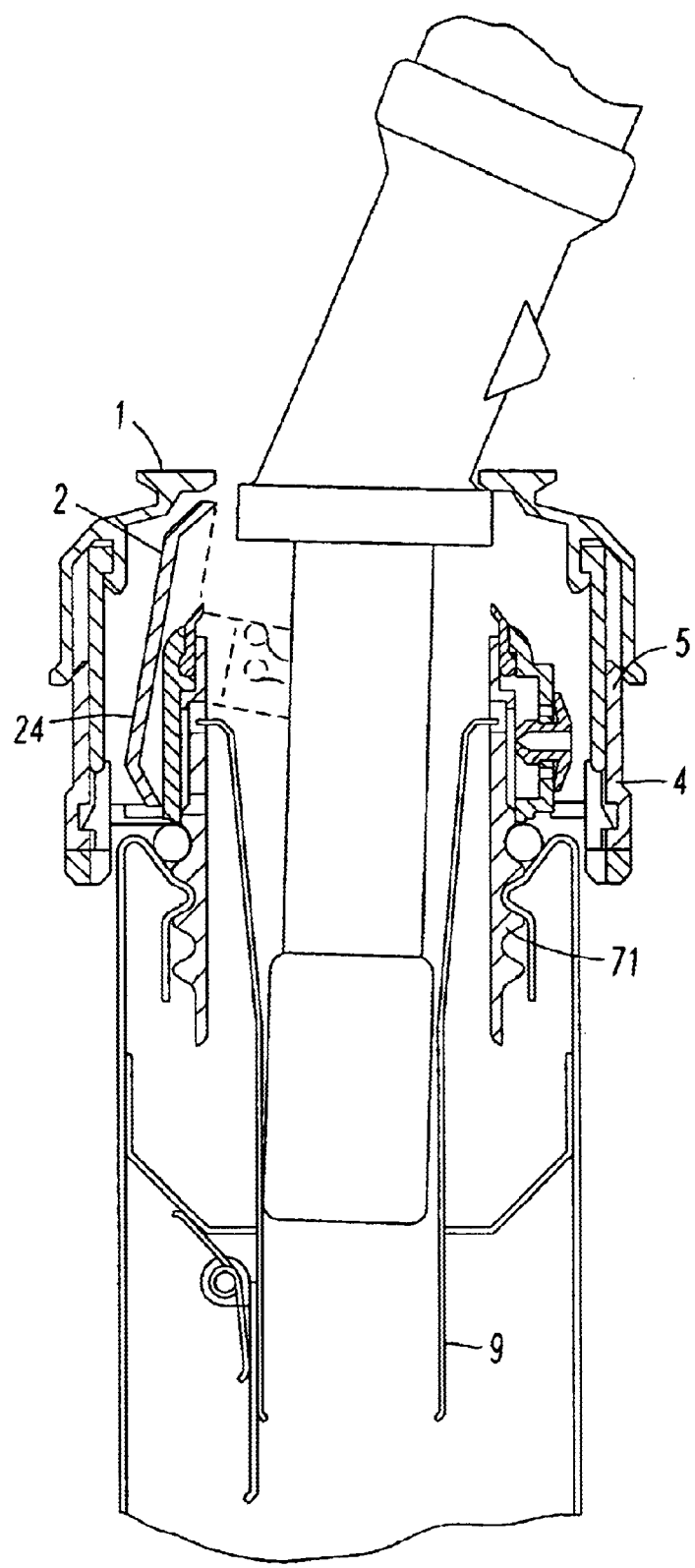
FIG. 7 shows a longitudinal cross sectional view of the fuel tank closure at FIGS. 1 and 2 in the opened state with a fuel nozzle inserted.

During refueling, the coupling part 1 is turned which causes the rotary ring 4 to also turn. When this occurs, the slide pins 41 move out of the closed position of the helical groove 51 and the sliding sleeve 5 moves upward together with the coupling part 1. In this way, the coupling part 1 releases the closure part 2. Continued turning of the coupling part 1 and the resulting displacement of the sliding sleeve 5 also pushes the pivot pins 23 of the closure part 2 up so that the closure part 2 is lifted off the mouth of the pipe part and off the lip seal 3 in the axial direction during this first phase of the opening motion. The crank pins 21 of the closure part 2 then slide in to the first axial section 621 of the crank groove 62 of the crank guide, by which the above described lifting of the closure part 2 in the axial direction is allowed to be achieved. The crank groove 62 however, then curves in the curved section 622 so that the crank pins 21 are mutually swivelled out parallel to the plane of the drawings. The closure part 2 is swivelled in the course of this second phase of the opening motion around the transverse axis which is defined by the pivot pins 23. The respective pivot pin 23 which continues to move up to some extent in the axial direction, overtakes the respective crank pin 21 which runs into the curved section 622 so that the closure part is swivelled around the pins 23 by roughly 90° until the mouth of the pipe part is exposed. In this manner, the crank grooves 62 and the crank pins 21 act as a crank guide which restrains the movement of the closure part 2 and causes the closure part 2 to swivel in operation. In the course of this process, as a result of the displacement of the sliding sleeve 5, the coupling part 1 is lifted further in the axial direction so that the necessary free space for movement of the closure part 2 is created as shown in FIG. 7.

Then the fuel nozzle is inserted into the guide pipe 9 until the mouth of the fuel nozzle reaches into the cylindrical part of the guide pipe 9. The no-lead flap of the tank filler pipe is kept in the open position by the lower end of the guide pipe 9. As the fuel is supplied through the fuel nozzle, the vapors displaced from the fuel tank are allowed to emerge to the outside via the openings 92 and can be drawn in by a sleeve of the refueling means which surrounds the fuel nozzle.

After adding the desired amount of fuel, the fuel nozzle is pulled back and the coupling part 1 is turned clockwise so that reversal of the above described sequence occurs and the closure part 2 is guided onto the mouth of the pipe part and is pressed closed by the coupling part 1 from above.

Figure 4:
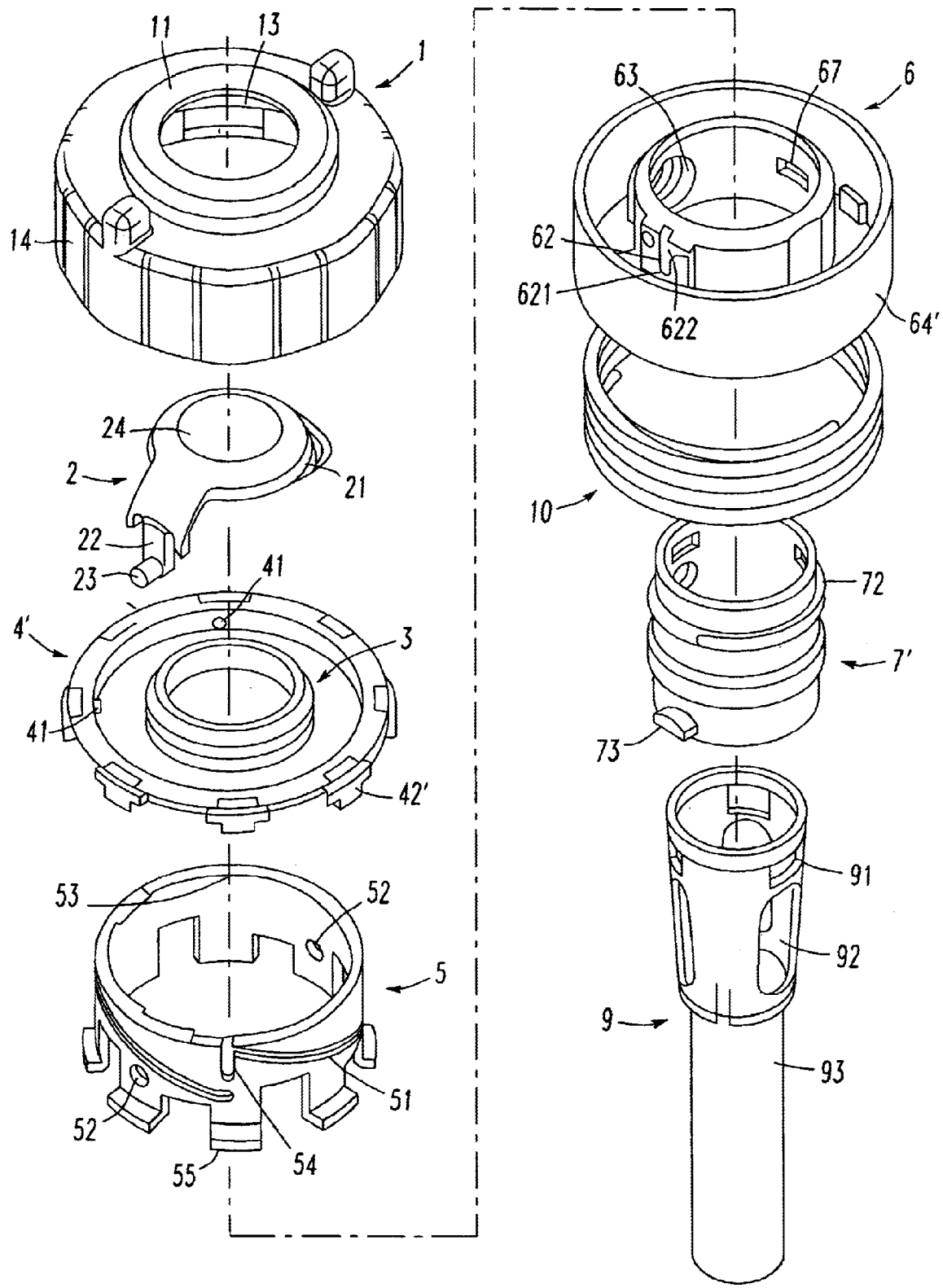
FIG. 4 shows a perspective exploded view of the fuel tank closure of FIG. 3.

FIG. 4 shows another embodiment of a fuel tank closure 102 in a perspective exploded view. The elements of this embodiment which are substantially common to the elements of fuel tank closure 101 illustrated in FIGS. 1 and 2 have been indicated using common numerals whereas those elements which are not common have been identified with corresponding numerals with a prime designation.

The fuel tank closure 102 of FIG. 4 comprises a coupling part 1 which has a center opening 13 with an inside diameter which is larger than the diameter of a conventional standard fuel nozzle. In the area of the opening 13, the coupling part 1 has a cylindrical section 11. The coupling part 1 widens downward following the cylindrical section 11 into another cylindrical section 14. Longitudinal grooves (not shown) are provided on the inside of the cylindrical section 14.

The fuel tank closure 102 from FIG. 4 also comprises a closure part 2, with a cap 24 to which two braces 22 extending in the axial direction are attached on the two opposing sides of the cap 24. On each of the free ends of the two braces 22, there is one pivot pin 23 which points generally radially outward. On the inner sides of each of the two braces 22, there are crank pins 21 which point radially inward. The fuel tank closure 102 also comprises a lip seal 3 which is substantially cylindrical in shape.

In addition, the fuel tank closure 102 of the embodiment of FIG. 4 includes a rotary ring 4'. On the inside of the rotary ring 4', there are provided four slide pins 41 which project radially inward. The outside wall of the rotary ring 4' is profiled to be complementary to the inside wall of the coupling part 1 and has radially projecting points 42'. The outside diameter of the rotary ring 4' corresponds to the inside diameter of the cylindrical section 14 of the coupling part 1 so that the two parts fit into each other, the radially projecting points 42' fitting into the longitudinal grooves of the coupling part 1. This yields a torsionally strong connection between the rotary ring 4' and the coupling part 1. The coupling part 1 however, remains axially movable relative to the rotary ring 4'.

In addition, a cylindrical sliding sleeve 5' is provided with four helical grooves 51 on its outside wall and have an axially running section 54 on their top end. The sliding sleeve 5' is also provided with two diametrically opposing through holes 52. The lower edge of the sliding sleeve 5' is crenelated and has projections 55 which project radially outward. On the upper edge, a peripheral catch bridge 53 which points radially inward is provided.

A flange part 6' which has a cylindrical section 61 and a pot-shaped part 64' is also provided in the fuel tank closure 102. The outside diameter of the cylindrical section 61 corresponds roughly to the distance between the two axial braces 22 of the closure part 2. Crank grooves 62 (only one shown) are provided at two diametrically opposing points on the cylindrical section 61 to accommodate the crank pins 21 located on the inside of the braces 22 of the closure part 2. Each of the crank grooves 62 has an axial section 621 in the bottom area and an adjoining curved section 622 in the top area. As can be seen from FIG. 4, the crank groove 62 curves to the right in the top area. In the other groove (not shown) which is diametrically opposite the illustrated crank groove 62, the top curved section has a left-hand curvature so that the two curved sections end parallel and pointing in the same direction. These crank grooves 62 and the crank pins 21 essentially form a crank guide which restrains the movement of the closure part 2 and causes the closure part 2 to swivel in operation as will be explained below. The inside wall of the cylindrical section 61 are provided with notches 67.

The fuel tank closure 102 also includes a flange part 6' with a pot-shaped part 64' which is provided with openings (not shown) at its bottom which correspond in their shape to the crenelated bottom edge of the sliding sleeve 5. The fuel tank closure 102 further includes a spring 10 made as a compression spring.

The fuel tank closure 102 shown in FIG. 4 is designed to be retrofitted on a motor vehicle which uses a quarter-turn cap fastener (bayonet type cap). Consequently, the fuel tank closure 102 of FIG. 4 includes an insert pipe 7' which has two diametrically opposed catch hooks 73. The insert pipe 7' is dimensioned such that it can be inserted into a standard tank filler pipe designed to receive such quarter-turn cap fastener. In its top area, the insert pipe 7' has a radially projecting saw tooth projection 72. The outside diameter of the insert pipe 7' in this area corresponds to the inside diameter of the cylindrical section 61 of the flange part 6. The notches 67 fit behind the saw tooth projection 72 in the assembled state so that the flange part 6' and the insert pipe 7' can be securely joined to one another.

Finally, the fuel tank closure 102 according to the second embodiment as illustrated in FIG. 4 comprises a guide pipe 9 having a conical section or positioning and retention skirt 91 with openings 92 and a cylindrical section 93.

Figure 3:
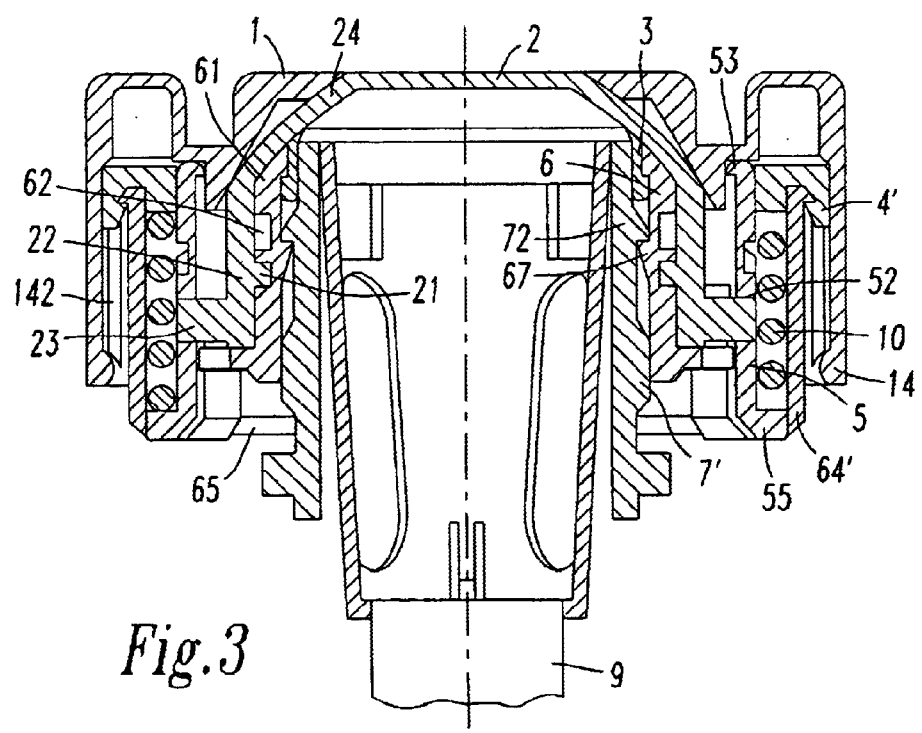
FIG. 3 shows a longitudinal cross sectional view of an assembled fuel tank closure according to another embodiment of the present invention.

FIG. 3 shows a longitudinal cross sectional view of the assembled fuel tank closure 102 of FIG. 4 discussed above. The pipe part which can be closed by the closure part 2 is comprised of a cylindrical section 61 of the flange part 6 and the top section of the insert pipe 7'. On the upper edge of the mouth between the cylindrical section 61 and the top area of the insert pipe 7', the lip seal 3 is pressed in and projects slightly in the axial direction thereby performing the sealing function relative to the closure part 2. The flange part 6' and the insert pipe 7' are locked to one another via the saw tooth projections 72 and the notches 67 so that a rigid connection is formed between the two parts. The guide pipe 9 is positioned within the insert pipe 7'.

In the closed state of the fuel tank closure 102, the edge of the mouth of the pipe part which comprises the cylindrical section 61 and the insert pipe 7', that is, the edge provided with the lip seal 3, is covered by the cap 24 of the closure part 2. The two diametrically opposing braces 22 of the closure part 2 surround the cylindrical section 61 of the flange part 6' and the crank pins 21 of the closure part 2 fit into the crank grooves 62 of the flange part 6'. The sliding sleeve 5' is carried by the flange part 6'. Because the crenelated bottom edge of the sliding sleeve 5' fits into the openings 65 of the flange part 6', precise axial guidance is provided but the sliding sleeve 5' cannot twist with respect to the flange part 6'. The pivot pins 23 of the closure part 2 fit into the diametrically opposing holes 52 of the sliding sleeve 5'. The sliding sleeve 5' is surrounded by the rotary ring 4' and the slide pins 41 (not shown) of the rotary ring 4' which project radially inward fit into the helical grooves 51(not shown) of the sliding sleeve 5'. The rotary ring 4' is clipped on to the outside edge of the pot-shaped part 64' and a spring 10 is positioned between the rotary ring 4' and the projections 55 of the sliding sleeve 5'.

The coupling part 1 with its cylindrical section 14 partially covers the pot-shaped part 64' and the radially projecting points 42' of the rotary ring 4' fit into the longitudinal grooves (not shown) on the inside wall of the coupling part 1 so that a form-fitted, torsionally strong connection is established between the coupling part 1 and the rotary ring 4'. However, the coupling part 1 remains freely movable in the axial direction relative to the rotary ring 4'. Three projecting claws (not shown) of the coupling part 1 fit behind the catch bridge 53 of the sliding sleeve 5' so that the coupling part 1 and the sliding sleeve 5' are mutually fixed axially, but can be rotated relative to one another. As noted previously, the spring 10 is supported between the projections 55 of the sliding sleeve 5' and the rotary ring 4'.

The operation of the fuel tank closure 102 described above is more clearly illustrated in FIG. 5 in conjunction with FIGS. 3 and 4. In operation, the fuel tank closure 102 which has the dimensions of a standard tank cap, is inserted with the catch hooks 73 of the insert pipe 7' into a motor vehicle tank filler pipe 140 designed to receive a quarter-turn cap fastener with interpositioned seal 141. The insert pipe 7' is secured against removal by a cotter pin (not shown).

In the position shown in FIG. 3, the mouth is sealed tight by the cap 24 of the closure part 2 with interpositioned lip seal 3. The closure part 2 is pressed against the lip seal 3 since the pivot pins 23 of the closure part 2 are pulled by the sliding sleeve 5' in the direction toward the interior of the tank filler pipe 140 by the action of the spring 10. In addition, the coupling part 1 presses against the closure part 2 and secures it against unintended opening even during an accident.

During refueling of the motor vehicle, the coupling part 1 is turned counterclockwise. By turning the coupling part 1, the rotary ring 4' is also turned. When this occurs, the slide pins 41 move into the helical groove 51 and the sliding sleeve 5' moves upward together with the coupling part 1. In this way, the coupling part 1 releases the closure part 2. Continued turning of the coupling part 1 and the resulting displacement of the sliding sleeve 5' also pushes the pivot pins 23 of the closure part 2 upward so that the closure part 2 is lifted off the mouth of the pipe part and off the lip seal 3 in the axial direction during this first phase of its opening motion. The crank pins 21 of the closure part 2 then slide in to the axial section 621 of the crank groove 62, by which the above described lifting of the closure part 2 in the axial direction is allowed to be achieved. The crank groove 62 however, then curves in the curved section 622 so that the crank pins 21 are mutually swivelled out parallel to the plane of the drawings. The closure part 2 is swivelled in the course of this second phase of the opening motion around the transverse axis which is defined by the pivot pins 23. The respective pivot pin 23 which continues to move up to some extent in the axial direction, overtakes the respective crank pin 21 which runs into the curved section 622 so that the closure part is swivelled around the pivot pins 23 by roughly 90° until the mouth of the pipe part is exposed. In this manner, the crank grooves 62 and the crank pins 21 act as a crank guide which restrains the movement of the closure part 2 and causes the closure part 2 to swivel in operation. In the course of this process, as a result of the displacement of the sliding sleeve 5', the coupling part 1 is lifted further in the axial direction so that the necessary free space for movement of the closure part 2 is created.

Figure 5:
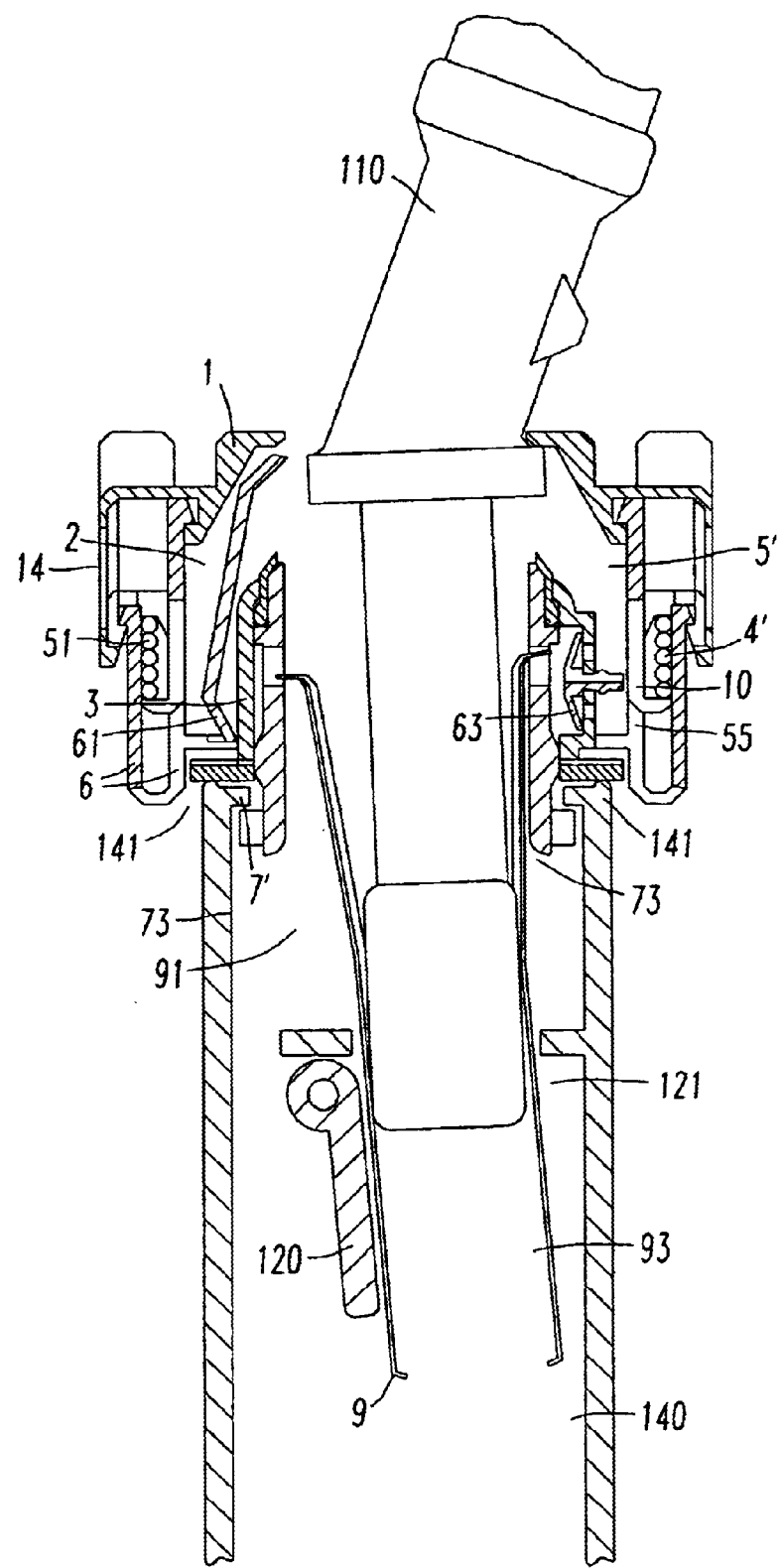
FIG. 5 shows a longitudinal cross sectional view of the fuel tank closure of FIGS. 3 and 4 in the opened state and with a fuel nozzle inserted.

FIG. 5 shows a cross section of the fuel tank closure 102 illustrated in FIG. 3, however the plane of the section being turned by 90° relative to the plane of the cross section of FIG. 3. In addition, the fuel tank closure 102 is shown in the opened state with the fuel nozzle 110 inserted. The closure part 2 is swivelled to the side thereby exposing the mouth of the pipe part which can comprise the cylindrical section 61 and the flange part 6' of the insert pipe 7' which is equipped with the lip seal 3. The fuel nozzle 110 was inserted into the guide pipe 9 until the mouth of the nozzle reached the cylindrical part of the guide pipe 9. As can be seen, the no-lead flap 120 of the tank filler pipe 140 is kept in the open position by the lower end of the guide pipe 9.

After adding the desired amount of fuel, the fuel nozzle 10 is withdrawn and the coupling part 1 is turned clockwise so that reversal of the above described sequence occurs and the closure part 2 is guided onto the mouth of the pipe and is pressed closed by the coupling part 1 from above.

Figure 6:
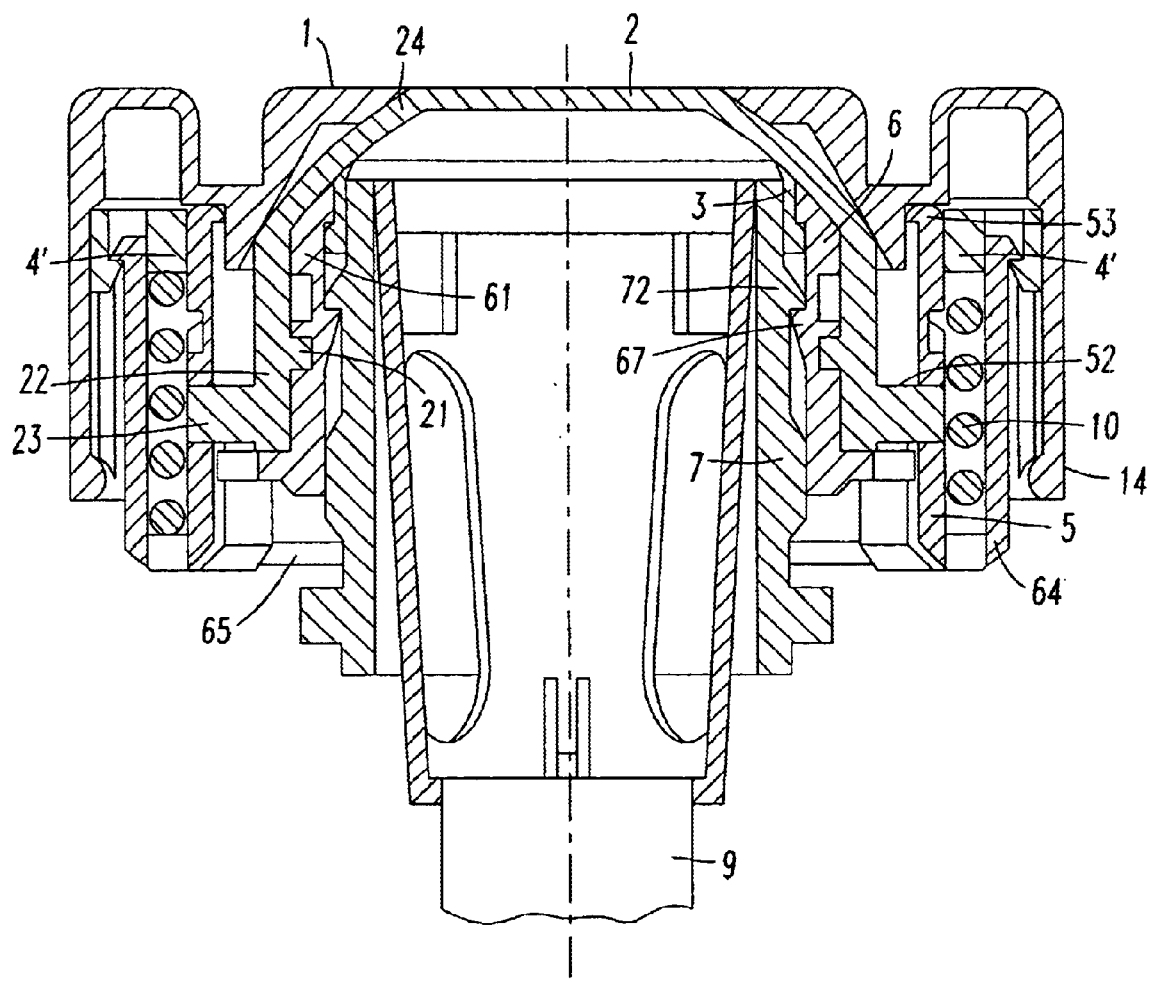
FIG. 6 shows a longitudinal cross sectional view of a fuel tank closure according to yet another embodiment of the present invention.

FIG. 6 shows a longitudinal cross sectional view of a fuel tank closure 103 according to yet another embodiment of the present invention. The fuel tank closure 103 shown in FIG. 6 differs from the fuel tank closure 102 of FIG. 3 in that the spring 10 is made as a compression/torsion spring. The projections 55 of the sliding sleeve 5 which are present in the fuel tank closure 102 of FIG. 3 are omitted so that the spring 10 does not strike these projections. Instead, the spiral-shaped spring 10 is securely connected to the rotary ring 4' at one of its free ends, while the second end is angled and hooks into the sliding sleeve 5' (hook connection not shown).

If the fuel tank closure 103 is opened by turning the coupling part 1, the pre-stressed spring 10 twists and exerts a reset torque via the rotary ring 4' on the coupling part 1 so that after releasing the coupling part 1, it is turned back into the initial position thereby automatically closing the fuel tank closure 103.

When the fuel tank closure 103 is opened by axially pulling on the coupling part 1, the spring 10 acts as a compression spring as in the embodiment of FIG. 3, which after the release of the coupling part 1, returns it again to its initial position as the closure part 2 is closed.

The remaining structure and function of the fuel tank closure 103 as shown in FIG. 6 are identical to the structure and function of the fuel tank closure 102 which was shown in FIGS. 3 and 4 and discussed in detail previously. Therefore, to prevent repetition, detailed description is omitted and reference is made to the aforementioned description in this regard.

Figure 8:
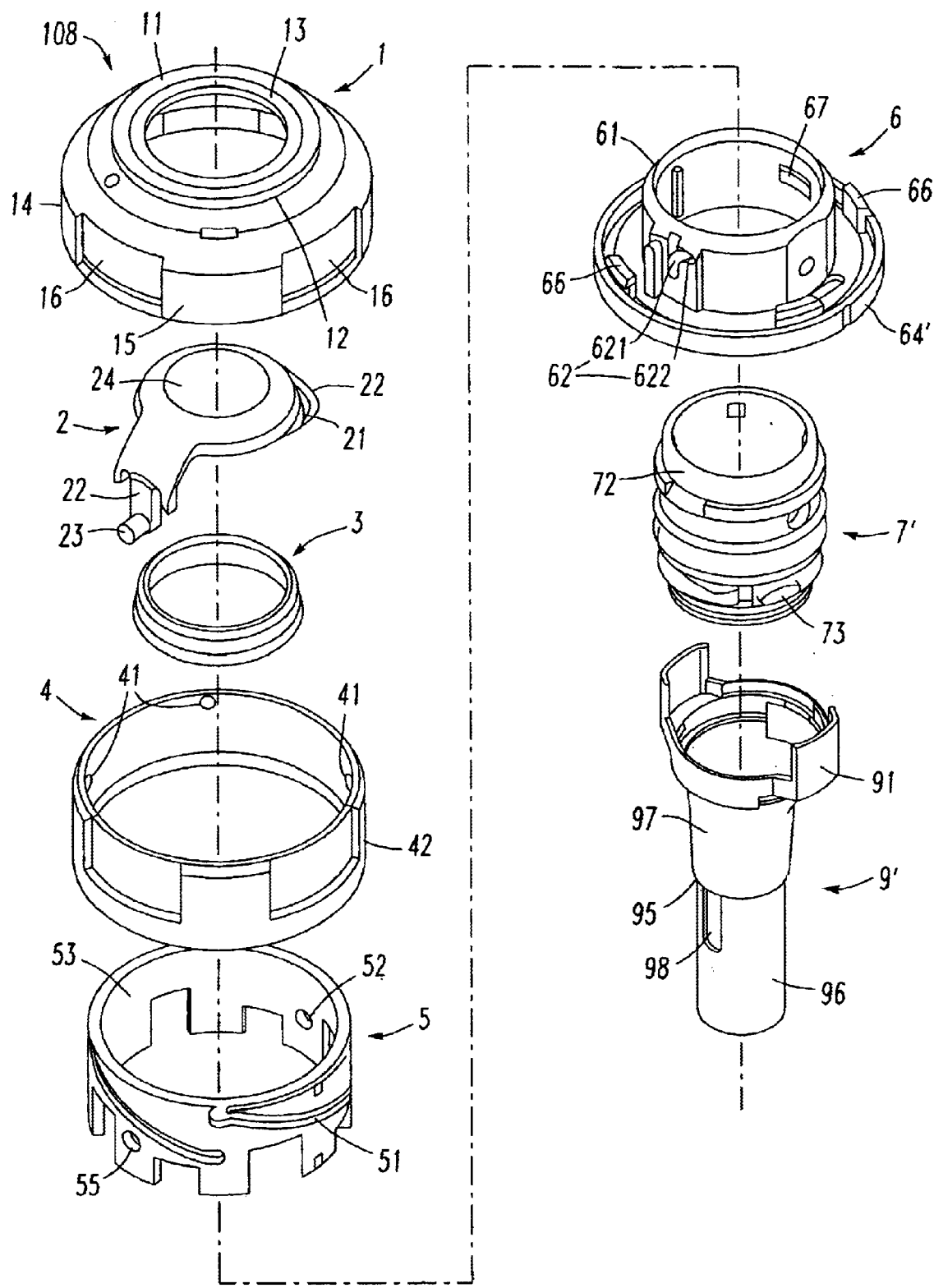
FIG. 8 shows a perspective exploded view of the fuel tank closure in accordance with another embodiment of the present invention.

The fuel tank closure 108 shown in FIG. 8 comprises a coupling part 1 which has a center opening 13 with an inside diameter which is larger than the diameter of a conventional standard fuel nozzle. In the area of the center opening 13, the coupling part 1 has a cylindrical section 11 having a circular groove portion 12. The coupling part 1 widens downward following the cylindrical section 11 into another cylindrical section 14. The cylindrical section 14 is radially profiled with raised points 15 and sunken points 16 which continue into the inner wall of the cylindrical section 14.

The fuel tank closure 108 from FIG. 8 also comprises a closure part 2 with a cap 24 to which two braces 22 extending in the axial direction are attached on the two opposing sides of the cap 24. On each of the free ends of the two braces 22, there is one pivot 23 which points generally radially outward. On the inner sides of each of the two braces 22, there are crank pins 21 which point radially inward. The fuel tank closure 108 also comprises a lip seal 3 which is substantially cylindrical in shape. A rotary ring 4 which is substantially cylindrical in shape is also provided in the illustrated fuel tank closure 108. In the vicinity of the inside upper edge of the rotary ring 4, there are four slide pins 41 which project radially inward. The outside wall of the rotary ring 4 is profiled to be complementary to the inside wall of the coupling part 1 and has raised portions 42 and sunken portions 43. The outside diameter of the rotary ring 4 corresponds to the inside diameter of the cylindrical section 14 of the coupling part 1 so that the two parts fit into each other, the respective raised and sunken portions 15, 16 and portions 42, 43 complementary fitting with one another. On the inside wall of the rotary ring 4, there is a peripheral groove 44.

In addition, a cylindrical sliding sleeve 5 is provided with four helical grooves 51 on its outside wall. The outside diameter of the sliding sleeve 5 corresponds to the inside diameter of the rotary ring 4 so that the sliding sleeve 5 is guided to fit in the rotary ring 4 while the slide pins 41 fit into the helical grooves 51. The sliding sleeve 5 is provided with two diametrically opposing through holes 52. The lower edge of the sliding sleeve 5 is crenelated while on the upper edge there is provided a peripheral catch bridge 53 which points radially inward.

A flange part 6 which has a cylindrical section 61 and a radial section 64 is also provided in the fuel tank closure 108. The outside diameter of the cylindrical section 61 corresponds roughly to the distance between the two axial braces 22 of the closure part 2. A crank guide is also provided on the cylindrical section 61 as will be discussed below. Crank grooves 62 which is a component of the crank guide (only one shown) are provided at two diametrically opposing points on the cylindrical section 61 to accommodate the crank pins 21 located on the inside of the braces 22 of the closure part 2. Each of the crank grooves 62 has an axial section 621 in the bottom area and an adjoining curved section 622 in the top area. As can be seen from FIG. 8, the crank groove 62 curves to the right in the top area. In the other crank groove (not shown) which is diametrically opposite the illustrated crank groove 62, the top curved section has a left-hand curvature so that the two curved sections end parallel and pointing in the same direction. These crank grooves 62 and the crank pins 21 essentially forms the crank guide which restrains the movement of the closure part 2 and causes the closure part 2 to swivel in operation as will be explained below. The inside walls of the cylindrical section 61 are provided with notches. Furthermore, elastic claws 66 are provided on the radial section 64 which can fit into the peripheral groove 44 of the rotary ring 4.

The fuel tank closure 108 shown in FIG. 8 is designed to be retrofitted on a motor vehicle which uses a quarter-turn cap fastener (bayonet-type cap). Consequently, the fuel tank closure 108 includes an insert pipe 7' which has two diametrically opposed catch hooks 73. The insert pipe 7' is dimensioned such that it can be inserted into a standard tank filler pipe designed to receive such a quarter-turn cap fastener (bayonettype cap). In its top area, the insert pipe 7' has a radially projecting saw tooth projection 72. The outside diameter of the insert pipe 7' in this area corresponds to the inside diameter of the cylindrical section of the flange part 6. The notches 67 fit behind the saw tooth projection 72 in the assembled state so that the flange part 6 and the insert pipe 7' can be securely joined to one another.

Finally, the fuel tank closure 108 comprises a guide pipe 9'. The guide pipe 9' has a conical section or positioning and retention skirt 91 which connects the guide pipe 9' to the insert pipe 7' by which it is rotatably connected to the other parts, described above, when the fuel tank closure 108 is in its assembled state. The guide pipe 9' has an upper section 97 and a lower section 96 which are connected to each other by a transition section 95. The guide pipe 9' has an axial extension which is at least four times as large as its overall diameter. In other words, the guide pipe 9' has a length so that it reaches about 10 to 13 cm into the interior of the tank filler pipe to a place where normally a no-lead flap is positioned in order to keep the no-lead flap in an open position with regard to flap 120 (as demonstrated in FIGS. 5 and 7). Using the guide pipe 9', a conventional standard fuel nozzle can be smoothly inserted for refueling purposes, until the tip of the fuel nozzle reaches a tapered transition section 95. The fuel nozzle has a diameter which is slightly larger than that of lower section 96 which is a section of reduced diameter with regard to section 97 of the guide pipe 9', so the tip of the fuel nozzle abuts at the tapered transition section 95.

In the wall of the guide nozzle 9' there is provided a lateral opening 98 which guarantees the functionality of the automatic final shut off of the fuel nozzle in order to avoid overflow during and after refueling.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

I claim:

1. A fuel tank closure for attachment on a tank filler pipe of a motor vehicle, said fuel tank closure comprising:

a movable closure part which selectively opens and closes access to an interior of the tank filler pipe;

a coupling part for actuating said closure;

a positioning and retention skirt extending from said coupling part for positioning and retaining the fuel tank closure with respect to the fuel tank filler pipe; and a guide pipe extending from and spaced radially inward from said positioning and retention skirt and which extends into the interior of the tank filler pipe, said guide pipe having an axial extension and an overall diameter such that said axial extension is at least four times as large as said overall diameter, said guide pipe having an upper section and a lower section, said lower section having a reduced diameter with regard to the diameter of the upper section, said guide pipe further having a frustroconical transition section provided approximately at the middle of the axial extension of said guide pipe connecting said upper section and said lower section, said transition section being adapted to receive a distal end of a standard fuel nozzle, and said guide pipe being further provided with an opening extending downwardly from said transition section.

2. The fuel tank closure of claim 1, wherein said opening is shaped as a slot which extends in an axial direction of said guide pipe.

3. The fuel tank closure of claim 1, wherein said guide pipe extends at least to an inner flap within the interior of the tank filler pipe.

4. The fuel tank closure of claim 1, wherein said frustroconical transition section includes at least one opening.

5. The fuel tank closure of claim 1, wherein said guide pipe comprises a cylindrical section of steel with a wall thickness between 0.25 and 0.8 mm.

6. The fuel tank closure of claim 1, wherein said closure part covers a mouth of a pipe part in a closed position and said closure part is placed into an open position by displacing said closure part from said mouth in an axial direction of said pipe part and by swivelling said closure part around an axis transverse to a longitudinal direction of said pipe part.

7. The fuel tank closure of claim 6, wherein said coupling part is coupled to a rotary ring so as to allow axial movement relative to one another and prevent rotational movement relative to one another.

8. The fuel tank closure of claim 7, wherein said rotary ring engages a sliding sleeve through a helical groove such that said sliding sleeve is axially displaced when said rotary ring is turned.

9. The fuel tank closure of claim 8, wherein said closure part is made cap-shaped and has two diametrically opposite braces which extend in an axial direction, said braces being connected to said sliding sleeve through a pivot pin and hole connection.

10. The fuel tank closure of claim 9, wherein said sliding sleeve is joined to said coupling part so as to allow rotational movement of said coupling part relative to said sliding sleeve and to prevent relative axial movement relative to one another.

11. The fuel tank closure of claim 10, wherein said braces surround said pipe part and a crank guide is provided between said braces and said pipe part.

12. The fuel tank closure of claim 11, wherein said crank guide comprises a crank pin and a crank groove.

13. The fuel tank closure of claim 6, wherein said crank groove of said crank guide includes an axial section formed in the axial direction to allow axial displacement of said closure part and an adjoining curved section to allow swivelling of said closure part.

14. The fuel tank closure of claim 13, wherein said insert pipe comprises an axially slidable plunger pipe which is movably coupled to said closure part.

15. The fuel tank closure of claim 6, further comprising a lip seal and said pipe part comprises an insert pipe and a flange part having a cylindrical section;
wherein said lip seal is positioned between said insert pipe and said cylindrical section and that projects said lip seal over the edge of the mouth of said pipe part.

16. The fuel tank closure of claim 15, wherein said insert pipe includes threads for installing said fuel tank closure on the tank filler pipe.

17. The fuel tank closure of claim 15, wherein said insert pipe includes a pair of catch hooks for installing said fuel tank closure on the tank filler pipe.

18. The fuel tank closure of claim 6, wherein said pipe part includes a pressure valve positioned on a side wall of said pipe part for regulating pressure in a fuel tank.

19. The fuel tank closure of claim 7, wherein said rotary ring is mounted to a flange part so as to allow rotational movement of said rotary ring with respect to said flange part and to prevent axial movement relative to one another.

20. The fuel tank closure of claim 7, wherein said sliding sleeve is joined to a flange part so as to allow axial movement of said sliding sleeve relative to said flange part and to prevent rotational movement relative to one another.

21. The fuel tank closure of claim 7, wherein a sliding sleeve is supported to move axially together with said coupling part against a force of a spring.

22. The fuel tank closure of claim 7, wherein said rotary ring is pre-stressed by a torsion spring.

23. A fuel tank closure for attachment on a tank filler pipe of a motor vehicle, said fuel tank closure comprising:
a movable closure part which selectively opens and closes access to an interior of the tank filler pipe;
a coupling part for actuating said closure part, said coupling part including an actuator for displacing said movable closure part between an open position and a closed position in response to a rotation of said coupling part; and
a guide pipe which extends into the interior of the tank filler pipe,
said guide pipe having an upper section and a lower section, said lower section having a reduced diameter with regard to the diameter of the upper section,
said guide pipe further having a frustroconical transition section provided approximately at the middle of the axial extension of said guide pipe connecting said upper section and said lower section, said transition section being adapted to receive a distal end of a standard fuel nozzle, and
said guide pipe being further provided with an opening extending downwardly from said transition section.

24. The fuel tank closure of claim 23, further comprising a positioning and retention skirt extending from said coupling part for positioning and retaining the fuel tank closure with respect to the fuel tank filler pipe.

25. The fuel tank closure of claim 24, wherein said guide pipe extends from and is spaced radially inward from said positioning and retention skirt.

26. The fuel tank closure of claim 25, wherein said guide pipe includes an axial extension and an average diameter such that the ratio between said average diameter and said axial extension is at least 1:4.

27. The fuel tank closure of claim 23, wherein said opening is shaped as a slot which extends in an axial direction of said guide pipe.

28. The fuel tank closure of claim 23, wherein said guide pipe extends at least to an inner flap within the interior of the tank filler pipe.

29. The fuel tank closure of claim 23, wherein said frustroconical transition section includes at least one opening.

30. The fuel tank closure of claim 23, wherein said closure part covers a mouth of the closure in the closed position and is displaced to the opening position by rotation of said closure part about an axis of rotation transverse to an axis of rotation of said coupling part.

31. The fuel tank closure of claim 30, wherein said coupling part is coupled to a rotary ring so as to allow axial movement relative to one another and prevent rotational movement relative to one another.

32. The fuel tank closure of claim 31, wherein said rotary ring engages a sliding sleeve through a helical groove such that said sliding sleeve is axially displaced when said rotary ring is turned.

33. The fuel tank closure of claim 32, wherein said closure part is made cap-shaped and has two diametrically opposite braces which extend in an axial direction, said braces being connected to said sliding sleeve through a pivot pin and hole connection.

34. The fuel tank closure of claim 33, wherein said sliding sleeve is joined to said coupling part so as to allow rotational movement of said coupling part relative to said sliding sleeve and to prevent relative axial movement relative to one another.

35. The fuel tank closure of claim 34, wherein said braces surround said pipe part and a crank guide is provided between said braces and said pipe part.

36. The fuel tank closure of claim 35, wherein said crank guide comprises a crank pin and a crank groove.

37. The fuel tank closure of claim 36, wherein said crank groove of said crank guide includes an axial section formed in the axial direction to allow axial displacement of said closure part and an adjoining curved section to allow swiveling of said closure part.

38. The fuel tank closure of claim 30, further comprising a lip seal and a said pipe part comprises an insert pipe and a flange part having a cylindrical section;
wherein said lip seal is positioned between said insert pipe and said cylindrical section and that projects said lip seal over the edge of the mouth of said pipe part.

39. The fuel tank closure of claim 38, wherein said insert pipe includes threads for installing said fuel tank closure on the tank filler pipe.

40. The fuel tank closure of claim 38, wherein said insert pipe includes a pair of catch hooks for installing said fuel tank closure on the tank filler pipe.

41. The fuel tank closure of claim 38, wherein said insert pipe comprise an axially slidable plunger pipe which is movably coupled to said closure part.

42. The fuel tank closure of claim 30, wherein said pipe part includes a pressure valve positioned on a side wall of said pipe part for regulating pressure in a fuel tank.

43. The fuel tank closure of claim 31, wherein said rotary ring is mounted to a flange part so as to allow rotational movement of said rotary ring with respect to said flange part and to prevent axial movement relative to one another.

44. The fuel tank closure of claim 31, wherein said sliding sleeve is joined to a flange part so as to allow axial movement of said sliding sleeve relative to said flange part and to prevent rotational movement relative to one another.

45. The fuel tank closure of claim 31, wherein a sliding sleeve is supported to move axially together with said coupling part against a force of a spring.

46. The fuel tank closure of claim 31, wherein said rotary ring is pre-stressed by a torsion spring.

47. A fuel tank closure for attachment on a tank filler pipe of a motor vehicle, said fuel tank closure comprising:

a movable closure part for selectively opening and closing access to an interior of the tank filler pipe;

a coupling part for actuating said closure part, said coupling part including an actuator for displacing said movable closure part between an open position and a closed position in response to an axial displacement of said coupling part; and a guide pipe which extends into the interior of the tank filler pipe, said guide pipe having an axial extension and an overall diameter such that said axial extension is at least four times as large as said overall diameter, said guide pipe having an upper section and a lower section, said lower section having a reduced diameter with regard to the diameter of the upper section, said guide pipe further having a frustroconical transition section provided approximately at the middle of the axial extension of said guide pipe connecting said upper section and said lower section, said transition section being adapted to receive a distal end of a standard fuel nozzle, and said guide pipe being further provided with an opening extending downwardly from said transition section.

* * * * *